United States Patent [19]
Farrell

[11] Patent Number: 5,803,377
[45] Date of Patent: Sep. 8, 1998

[54] APPARATUS AND METHOD FOR MAKING FROZEN DRINKS

[75] Inventor: James J. Farrell, Orinda, Calif.

[73] Assignee: f'Real! Foods, LLC, Orinda, Calif.

[21] Appl. No.: 794,859

[22] Filed: Feb. 5, 1997

Related U.S. Application Data

[62] Division of Ser. No. 649,534, May 17, 1996.

[51] Int. Cl.[6] .................................................. B02C 19/12
[52] U.S. Cl. ................... 241/36; 241/46.17; 241/199.12; 241/292.1
[58] Field of Search ................................ 241/33, 36, 38, 241/46.17, 57, 199.12, 292.1

[56] References Cited

U.S. PATENT DOCUMENTS

| | | |
|---|---|---|
| 496,674 | 5/1893 | Urbach . |
| 934,537 | 9/1909 | Johnson . |
| 1,313,830 | 8/1919 | Minsk . |
| 2,026,240 | 12/1935 | Luxmore . |
| 2,115,809 | 5/1938 | Goldman . |
| 2,701,131 | 2/1955 | Love . |
| 2,898,094 | 6/1959 | O'Neill, Jr. . |
| 2,941,885 | 6/1960 | Tomlinson . |
| 2,967,433 | 1/1961 | Phillips . |
| 3,154,123 | 10/1964 | Tomlinson . |
| 3,171,635 | 3/1965 | Haentjens et al. . |
| 3,295,997 | 1/1967 | Tomlinson et al. . |
| 3,514,080 | 5/1970 | Price et al. . |
| 3,738,619 | 6/1973 | Shirae ...................................... 259/108 |
| 4,169,681 | 10/1979 | Kato ......................................... 366/244 |
| 4,358,298 | 11/1982 | Ratcliff ....................................... 55/185 |
| 4,544,277 | 10/1985 | Schnellmann ............................. 366/78 |
| 4,547,076 | 10/1985 | Maurer .................................... 366/244 |
| 4,708,487 | 11/1987 | Marshall ................................. 366/206 |
| 5,150,967 | 9/1992 | Nelson et al. .......................... 366/206 |
| 5,328,263 | 7/1994 | Neilson .................................. 366/254 |
| 5,439,289 | 8/1995 | Neilson .................................. 366/207 |
| 5,580,007 | 12/1996 | Caviezel et al. .................... 241/199.12 |
| 5,599,103 | 2/1997 | Linscott .......................... 241/292.1 X |

FOREIGN PATENT DOCUMENTS 2158002   5/1973   Germany .

OTHER PUBLICATIONS

Product Literature for Hamilton Beach Models 936 P and 908. 1992.

*Primary Examiner*—John M. Husar
*Attorney, Agent, or Firm*—Limbach & Limbach L.L.P.

[57] ABSTRACT

The present invention is a frozen drink machine and a method for making frozen drinks from a frozen substance which has been frozen into a cup. According to the method and the machine of the present invention, a cup containing a frozen substance is positioned in a cup support located in the frozen drink machine. A rotatable blade having features for grinding the frozen substance and for aerating the ground frozen substance is lowered into the cup, grinding the frozen substance while a liquid is simultaneously introduced into the cup. In an alternative embodiment, a second blade is provided which incorporates air into the liquid before the liquid is introduced into the cup.

27 Claims, 13 Drawing Sheets

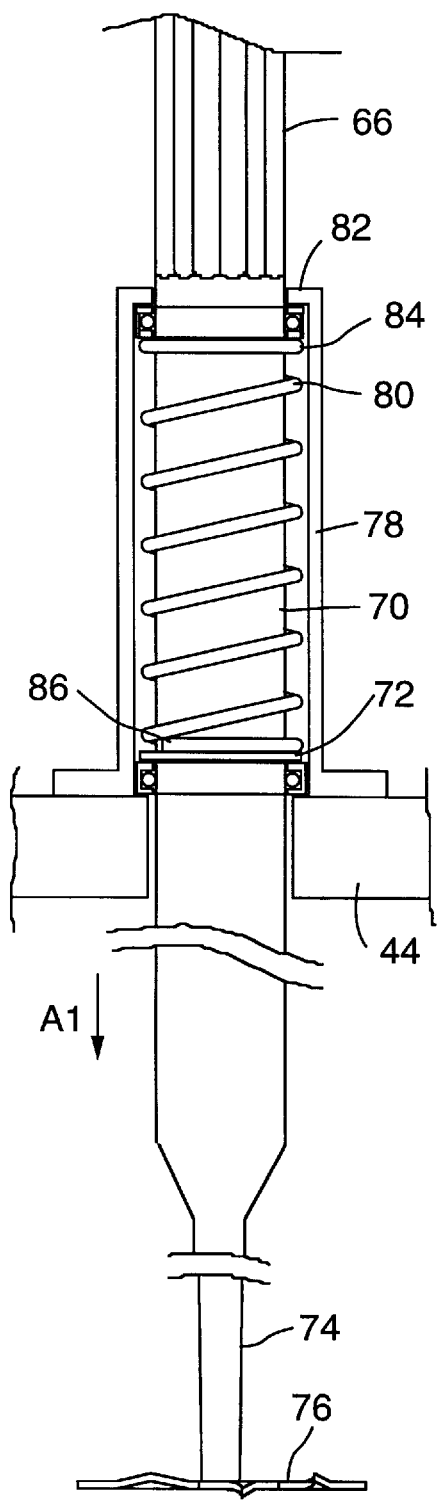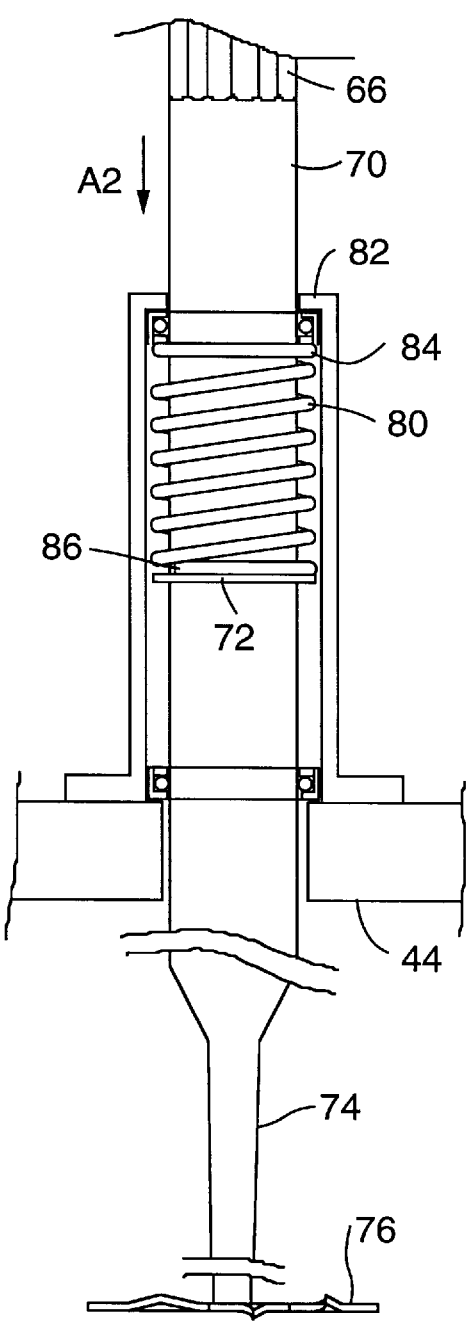
FIG. 5A
FIG. 5B

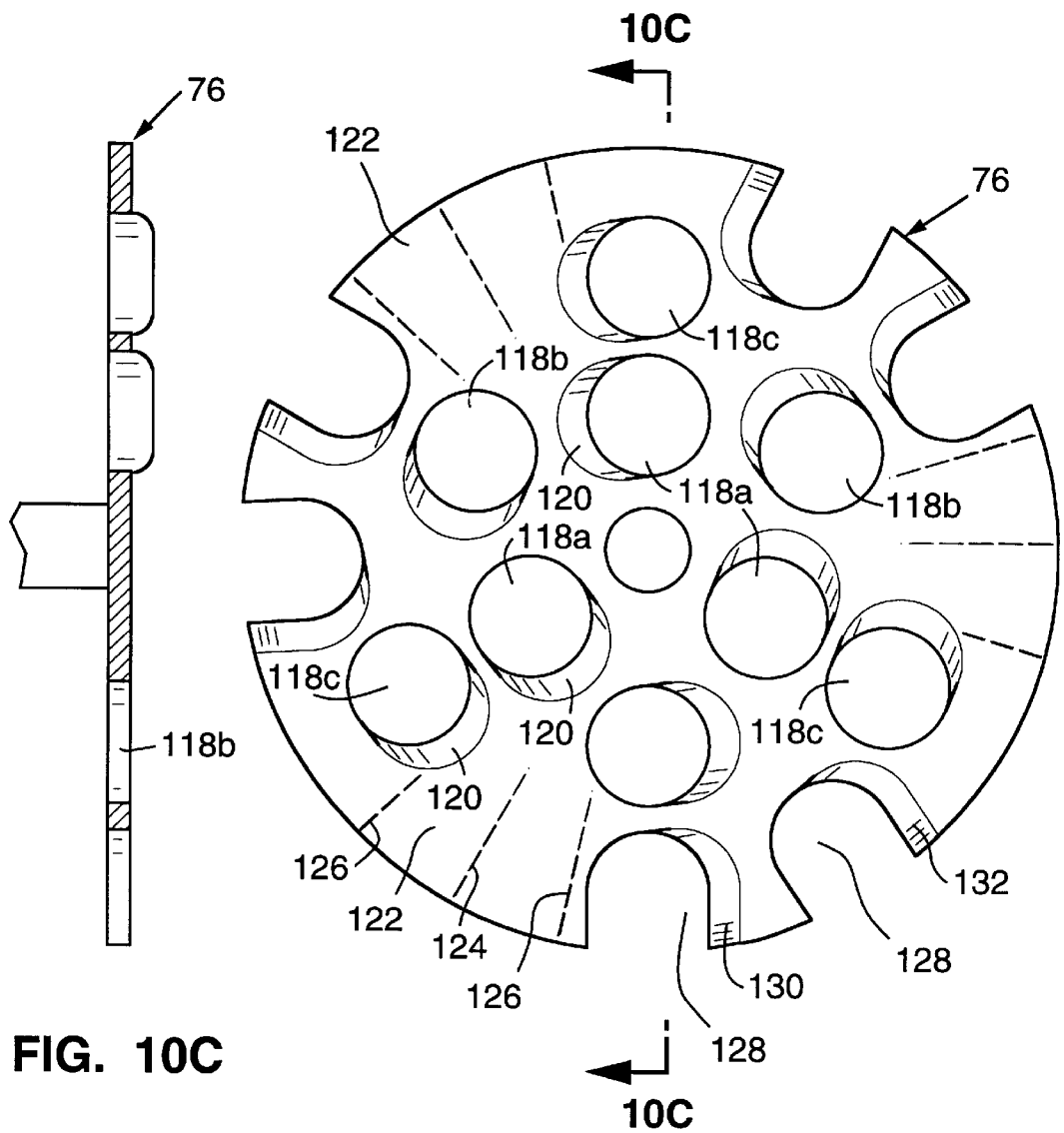
FIG. 10C
FIG. 10A
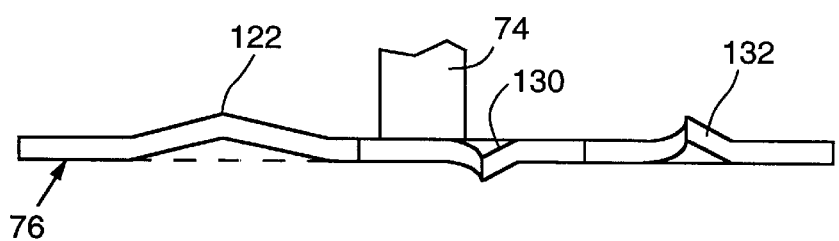
FIG. 10B

APPARATUS AND METHOD FOR MAKING FROZEN DRINKS

This application is a divisional of application Ser. No. 08/649,534, filed May 17, 1996 now pending.

FIELD OF THE INVENTION

The present invention relates generally to the field of food processing methods and equipment, and particularly to apparatuses and methods for making milkshakes and other frozen drinks.

BACKGROUND OF THE INVENTION

The present invention relates to an improved means of making milkshakes and other frozen drinks. Currently the two commercially prevalent methods of making milkshakes and other frozen drinks are: 1) placing frozen ingredients such as ice cream scoops or ice or frozen fruit into a blending/mixing receptacle, then adding liquid such as milk or juice or water, and then blending them together, or 2) using a dispensing freezer of the type in which liquid ingredients are automatically fed into a freezing cylinder, agitated by a dasher in the cylinder during the freezing operation, and then dispensed when desired through a front discharge valve.

The first method, while delivering an excellent quality milkshake or frozen drink, takes too much time and labor to be viable in high volume fast-food restaurants, where a major portion of the potential market lies. The second method, using a dispensing freezer, dominates the fast-food market, yet possesses several serious short-comings. The required dispensing freezer equipment is expensive to purchase, and very time consuming and expensive to clean and maintain. In addition, the quality of product this equipment produces, by its nature, does not recreate the "old fashioned" style lumpy/slushy texture that can only be achieved by blending frozen ingredients together with liquid ingredients and then serving immediately. Consumers do not respond nearly as favorably to the homogeneous texture produced by the dispensing freezer equipment as they do to the old fashioned texture, and therefore, these dispensing freezer drinks do not sell well, holding less than 3% market share of total restaurant beverage sales today.

The overall goal of this invention is to enable the creation of a consumer preferred old fashioned texture milkshake or other frozen drink that will fit into the operational constraints of today's high volume fast-food restaurants. In order to meet the operational constraints of today's fast-food restaurants this invention was developed to achieve three objectives.

The first objective is to create a milkshake or other frozen drink in 30 seconds or less. In the fast-food market literally every second of preparation time is critical. By enabling preparation time to be reduced by even a few seconds, a number of features of this invention are significant improvements over the existing art.

The second objective is to provide a frozen drink machine which requires very little labor for cleaning between servings or at the end of the day, and which improves safety from bacterial concerns. Both of the existing methods of preparation require excessive amounts of clean-up time, either between servings in the case of the blended method, or at the end of the day in the case of the dispensing freezer. In addition, because this cleaning is often poorly done, or neglected entirely, consumers are often put at risk of consuming unsafe food products. This is a serious health risk which this invention addresses in new and novel ways.

A third object of the present invention is to achieve levels of whipping/aeration of the frozen drink of at least 15% of total volume. This level of whipping is important for two reasons. First, it is critical to keeping ingredient costs of this new method in competitive alignment with milkshakes and frozen drinks produced by dispensing freezers, which are whipped to this level of aeration and higher. Second, whipping also substantially improves flavor delivery of a frozen drink by improving a consumer's ability to taste the drink as their sense of smell senses the frozen drink's aroma trapped inside the tiny bubbles created by the whipping process.

SUMMARY OF THE INVENTION

The present invention is a frozen drink machine and a method for making frozen drinks from a frozen substance which has been frozen into a cup. According to the method and the machine of the present invention, a cup containing a frozen substance is positioned in a cup support located in the frozen drink machine. A rotatable blade having features for grinding the frozen substance and for aerating the ground frozen substance is lowered into the cup, grinding the frozen substance while a liquid is simultaneously introduced into the cup. In an alternative embodiment, a second blade is provided which incorporates air into the liquid before the liquid is introduced into the cup.

BRIEF DESCRIPTION OF THE DRAWINGS

FIG. 5A is a front elevation view of a portion of the carriage, the sleeve mounted to the carriage, and the blade shaft extending through the sleeve and the carriage. The sleeve and carriage are cut-away to more clearly illustrate the structure of the shaft and the contents of the sleeve.

FIG. 5B is a front elevation view, similar to the view of FIG. 5A, in which the spring is in a compressed state.

FIGS. 10A and 10B are a top plan view and a side elevation view, respectively, of a blade according to the present invention.

FIG. 10C is a cross-sectional side view of the blade of FIGS. 10A and 10B, taken along the plane designated 10C—10C in FIG. 10A.

DETAILED DESCRIPTION OF THE INVENTION

Generally speaking, the milkshake and frozen drink machine according to the present invention allows milkshakes and other frozen drinks to be quickly made by breaking up frozen blocks of ingredients into small frozen particles, and combining them with an added liquid. The ingredients to be frozen into frozen blocks are pre-mixed in liquid form, placed into serving cups which are the same serving cups in which the finished milkshake or frozen drinks are to be served, and then frozen into blocks conforming to the insides of the serving cups and stored.

When a milkshake or other frozen drink is to be made, a serving cup containing the frozen block is positioned in the machine. A rotating blade is lowered into the cup and bores through the frozen substance in the cup. Milk or another liquid is added to the cup for blending with the frozen substance, which is broken up into small frozen particles by the boring blade. The machine introduces air into the liquid or the liquid plus frozen particle mixture in order to give the milkshake or frozen drink its proper volume, texture, and flavor delivery.

For the rest of this detailed description, the details of the machine and method will be provided with milkshakes as the end-product being produced, though it is to be understood that end-products such as smoothies or a variety of other frozen drinks can be made by the machine and method described herein.

Cup and Ingredients

Figure 1:
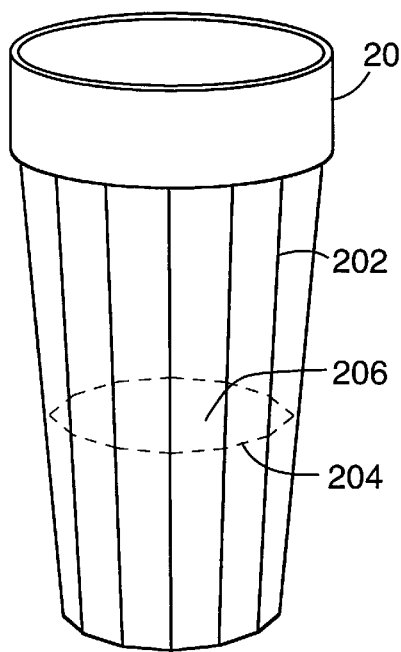
FIG. 1 is a perspective view of a milkshake cup according to the present invention.

A serving cup 200 of the type which may be used in the method and apparatus according to the present invention is shown in FIG. 1. The exterior surface of the cup 200 includes a plurality of ridges 202.

When ready for use in the machine according to the present invention, the cup 200 contains milkshake ingredients which are frozen into a block 204 which conforms to the shape of the cup. The block 204 includes an upper surface 206. The frozen substance preferably comprises all the ingredients required to make a milkshake, with the exception of the milk and the air (which gives the milkshake its volume and texture, and improves flavor delivery). Specifically a cup which will yield a sixteen fluid ounce volume milkshake typically contains a frozen block of approximately six fluid ounces of the same ingredients found in ice cream, but with no air incorporated. It should be pointed out that this differs from placing ice cream in the cup, because ice cream, by definition, contains air which is incorporated during freezing. For instance, the ice cream typically used in old-fashioned scooped type milkshakes typically contains approximately 45% air by volume.

The ingredients are frozen into the cup 200 and form a block of frozen substance that typically fills the cup by less than 50% of its total volume. As will be appreciated below, the full volume of the cup is used to contain milkshake once the milk and air are introduced into the cup during a milkshake making operation.

Milkshake and Frozen Drink Machine

Figure 2:
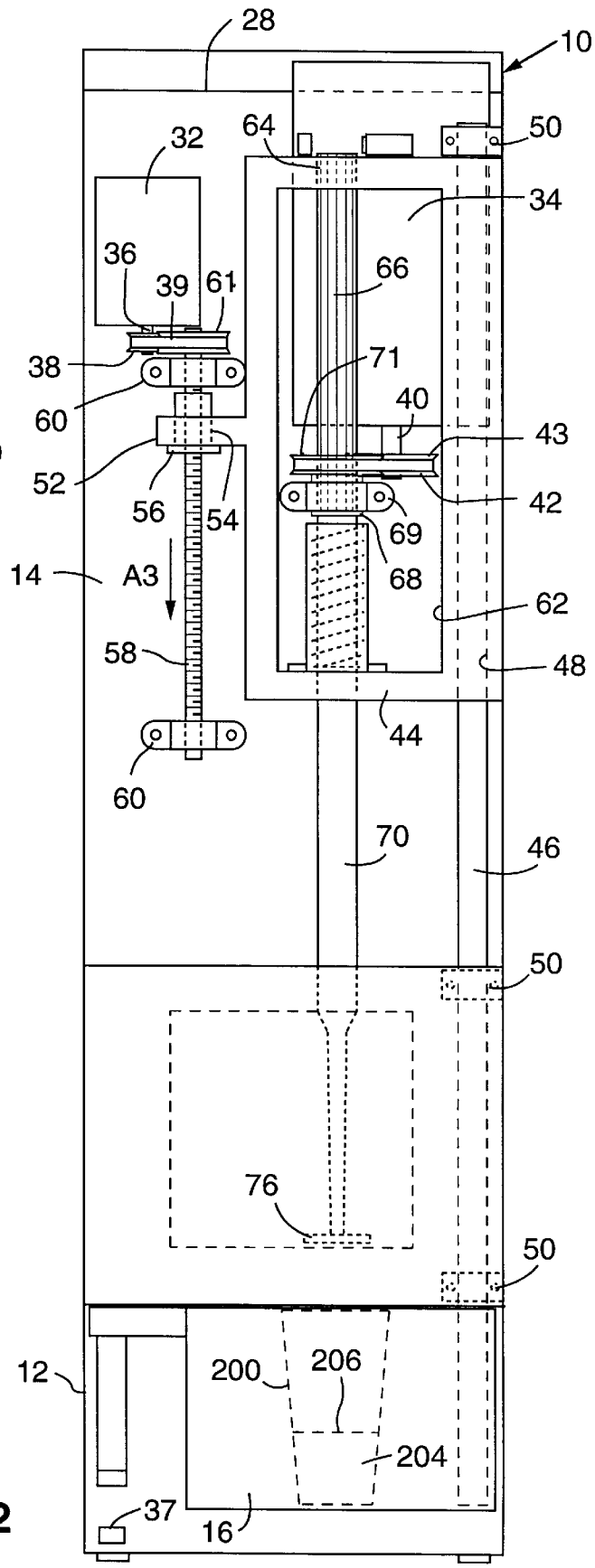
FIG. 2 is a front elevation view of a frozen drink machine according to the present invention, in which a front panel is removed to expose the carriage and blade drive assemblies.
Figure 3:
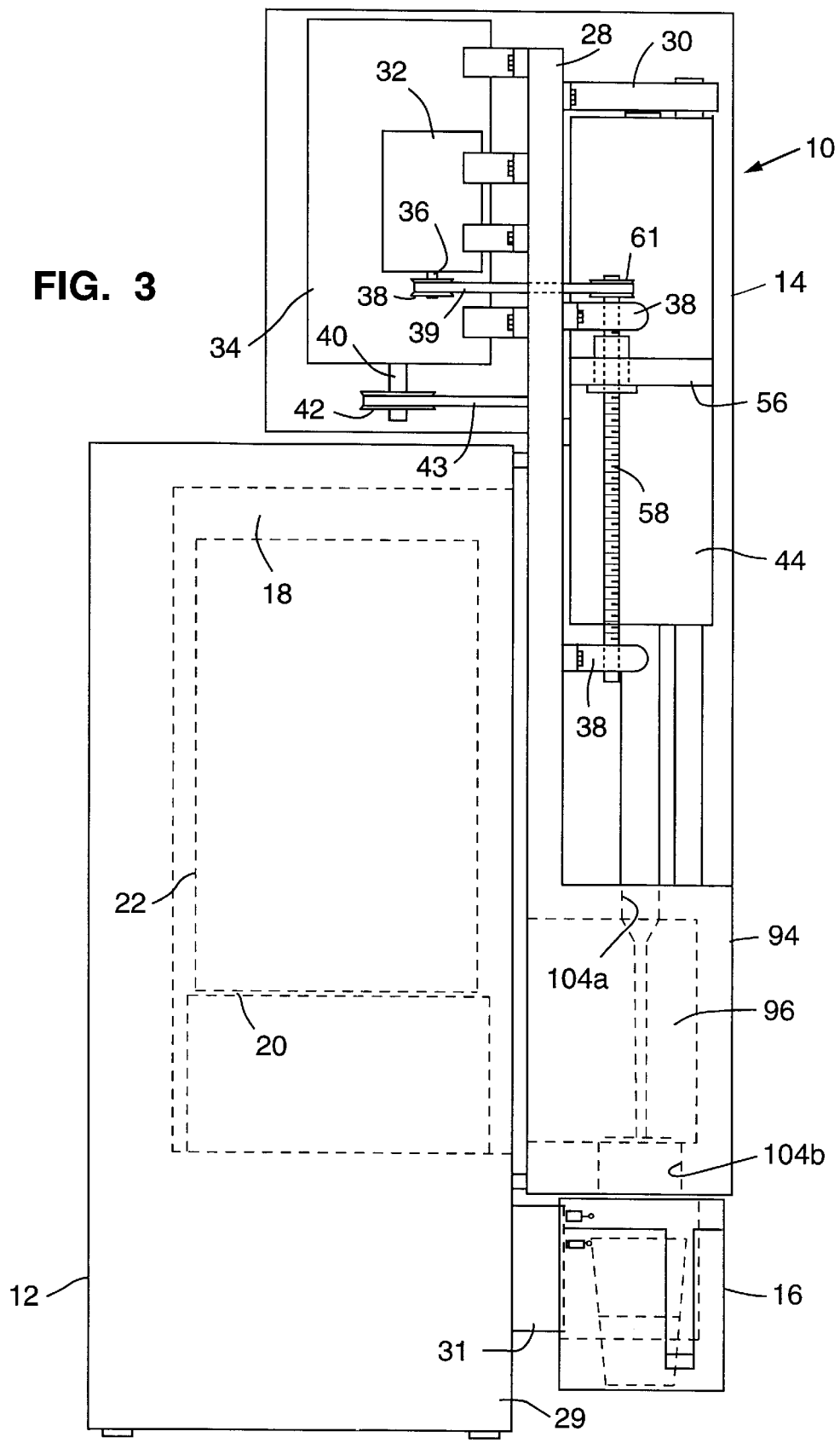
FIG. 3 is a side elevation view of the frozen drink machine of FIG. 2.

Referring to FIGS. 2 and 3, the frozen drink machine 10 according to the present invention is comprised generally of a refrigerator housing 12, a blending assembly housing 14, and a cup housing 16.

Figure 4A:
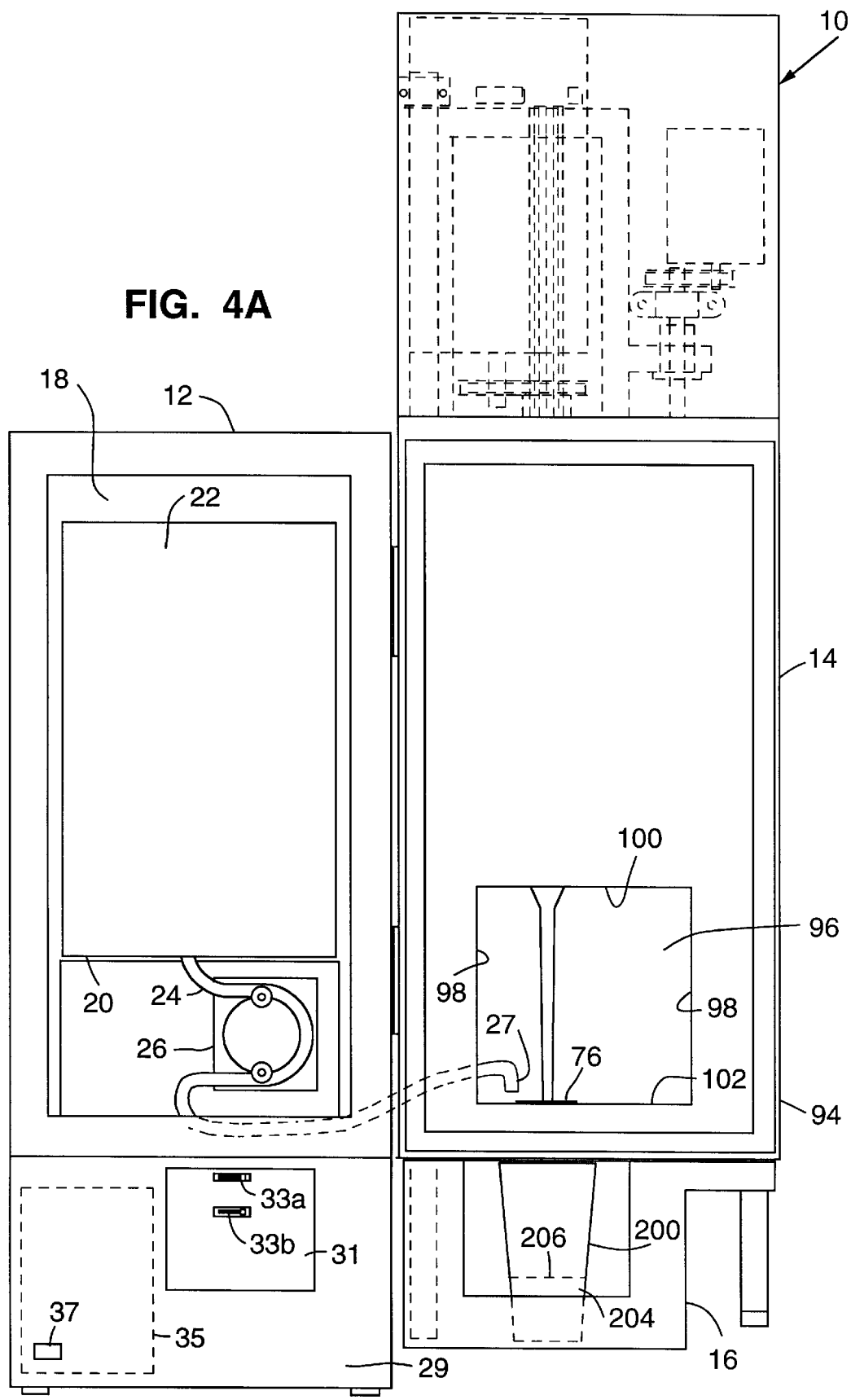
FIG. 4A is a front elevation view of the frozen drink machine of FIG. 2 in which the blending assembly housing has been pivoted to an open condition to expose the interior of the refrigerator housing and to further expose the back side of the blending assembly housing.

The refrigerator housing 12 may be a commercially available self-service bulk milk refrigerator dispenser of the type commonly found in cafeterias. For example, the Norris Dispenser Company Model N-5 milk refrigerator may be used. Referring to FIG. 4A, the refrigerator housing 12 includes a refrigerated compartment 18 having a shelf 20. Seated on the shelf is a box of milk 22 having a tube 24 extending from its lower face. Tube 24 extends through a peristaltic pump 26 and has an open end 27 positioned within blending assembly housing 14.

Refrigerator housing 12 includes a base portion 29 which lies below the refrigerated compartment 18. A block 31 (FIGS. 3 and 4A) extends from the base portion 29 and supports a pair of limit switches 33a, 33b.

A microprocessor 35 (FIG. 4A) is contained within the base portion 29 of the refrigerator housing 12. As will be discussed in detail below, the microprocessor 35 receives information from the limit switches 33a, 33b and other sensors which monitor operation of the milkshake machine, and manages the operation of the milkshake machine. A starting switch 37 is located on the front of the refrigerator housing 12 and is interfaced with the microprocessor 35 to deliver starting signals to the milkshake machine when triggered by a user.

Referring to FIG. 3, blending assembly housing 14 is hinged to the refrigerator housing 12 so that blending assembly housing 14 can be pivoted into the open position shown in FIG. 4A in order to allow the milk box 22 to be replaced. A support frame 28 is mounted to the blending assembly housing 14. Upper and lower support members 30 extend laterally from support frame 28.

Referring to FIGS. 2 and 3, two motors are mounted to frame 28 within the housing 14: a carriage motor 32 and a blade motor 34. Carriage motor 32 includes a shaft 36 which spins when the motor is activated. Shaft 36 is coupled to a first pulley 38 and a belt 39 is driven by first pulley 38. Carriage motor 32 is preferably a stepper motor capable of 1500 RPM and 140 ounce-inches of torque.

Blade motor 34 is preferably a one horsepower motor capable of up to 3400 revolutions per minute. It includes a rotatable shaft 40 which is coupled to a second pulley 42 such that activation of the blade motor 34 results in rotation of the second pulley 42. A belt 43 is driven by second pulley 42.

A carriage 44 is located within the housing 14. An elongated rod 46 (FIG. 2) extends through a bore 48 in the carriage 44 and is fixed to the support members 45. Rod 46 is secured to the blending assembly housing 14 by a number of mounting blocks 50. The bore 48 is proportioned such that the carriage 44 can slide easily along the rod 46, and linear bearings (not shown) are pressed into the ends of bore 48 to aid the sliding motion.

Referring to FIG. 2, carriage 44 includes a laterally extending member 52 having a bore 54. A ball nut 56 is secured within the bore 54, and a vertical screw drive 58 extends through the ball nut 56. The screw drive 58 is mounted to the support frame 28 by a pair of mounting members 60.

A third pulley 61 is attached to one end of screw drive 58. Belt 39 is coupled to pulley 61 such that rotation of pulley 38 results in corresponding rotation of third pulley 61. Thus, activation of carriage motor 32 results in rotation of screw drive 58. When screw drive 58 is rotated in this manner, ball nut 56 is caused to travel vertically along the screw drive 58 and to thereby move the carriage 44 vertically upward or downward, depending on the direction in which the screw drive is rotating.

Carriage 44 is a substantially rectangular frame having a rectangular center opening 62. A bore 64 extends through the upper end of the carriage 44 and into the opening 62. A splined spindle shaft 66 is slidably disposed in the bore 64. Splined shaft 66 extends through a bearing 68 which is mounted to the support frame 28 by a support 69. A fourth pulley 71, which is internally splined, is attached to the bearing 68 and belt 43 is coupled to fourth pulley 71. Thus, rotation of second pulley 42, such as by activation of blade motor 34, causes resultant rotation of splined fourth pulley 71.

During rotation of splined pulley 71, the splines in splined shaft 66 and splined pulley 71 are rotationally engaged with one another such that rotation of splined pulley 71 causes rotation of splined shaft 66. This engagement, however, does not prevent the splined shaft 66 from sliding vertically within the splined pulley 71 and bearing 68 during vertical movement of the carriage 44.

Splined shaft 66 includes a smooth section 70. A collar 72 (FIGS. 5A and 5B) surrounds and is fixed to the smooth section 70 of shaft 66. Shaft 66 further includes a tapered section 74 and a blade 76 attached to the tapered section 74.

Referring to FIG. 5A, smooth section 70 of shaft 66 extends through a sleeve 78 mounted to the carriage 44 within the opening 62 (opening 62 shown in FIG. 2). A shoulder 82 is formed at the top of sleeve 78.

A compression spring 80 surrounds the shaft section 70 and is housed within the sleeve 78. Spring 80 has a first end 84 which abuts the shoulder 82 and a second end 86 which abuts collar 72. When carriage 44 advances downwardly in the direction indicated by arrow A1, and blade 76 reaches the surface 206 of the frozen substance 204 in the cup, spring 80 becomes compressed between shoulder 82 and collar 72 as indicated in FIG. 5B. Gradually, shaft 66 slides downwardly, as indicated by arrow A2 in FIG. 5B, through the sleeve 78 until spring 80 returns to its relaxed condition shown in FIG. 5A.

Figure 6A:
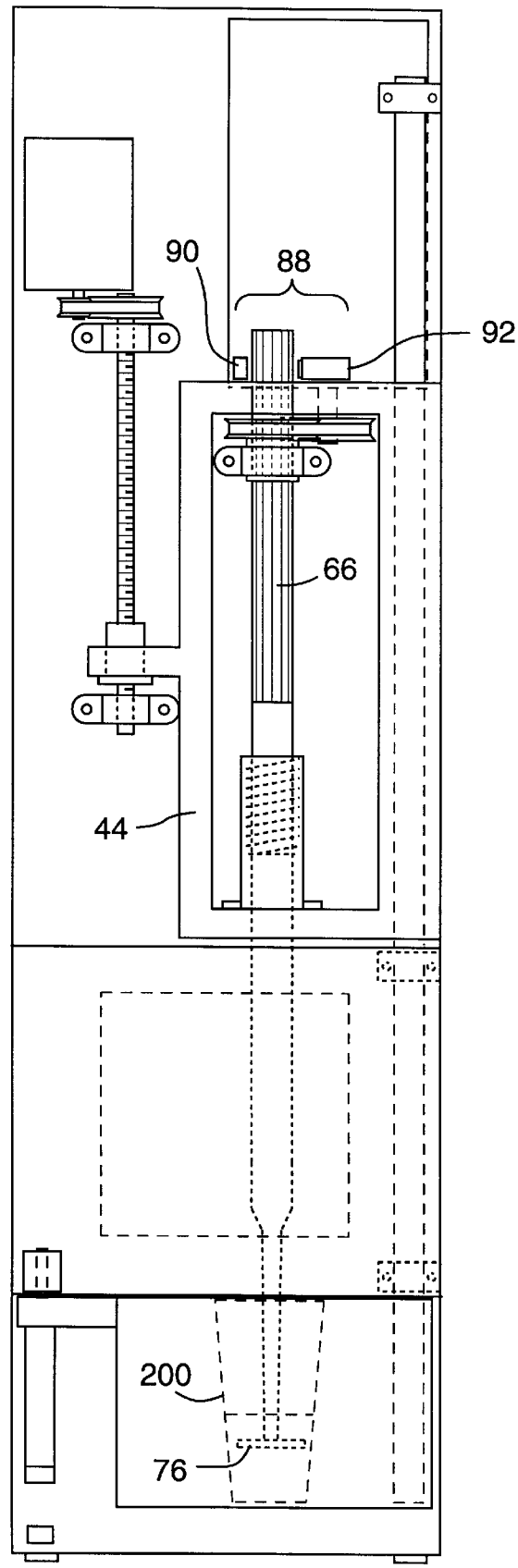
FIG. 6A is a front elevation view of the frozen drink machine of FIG. 2 showing the carriage at the end of its downward travel and showing the blade moving downwardly within the serving cup.
Figure 6B:
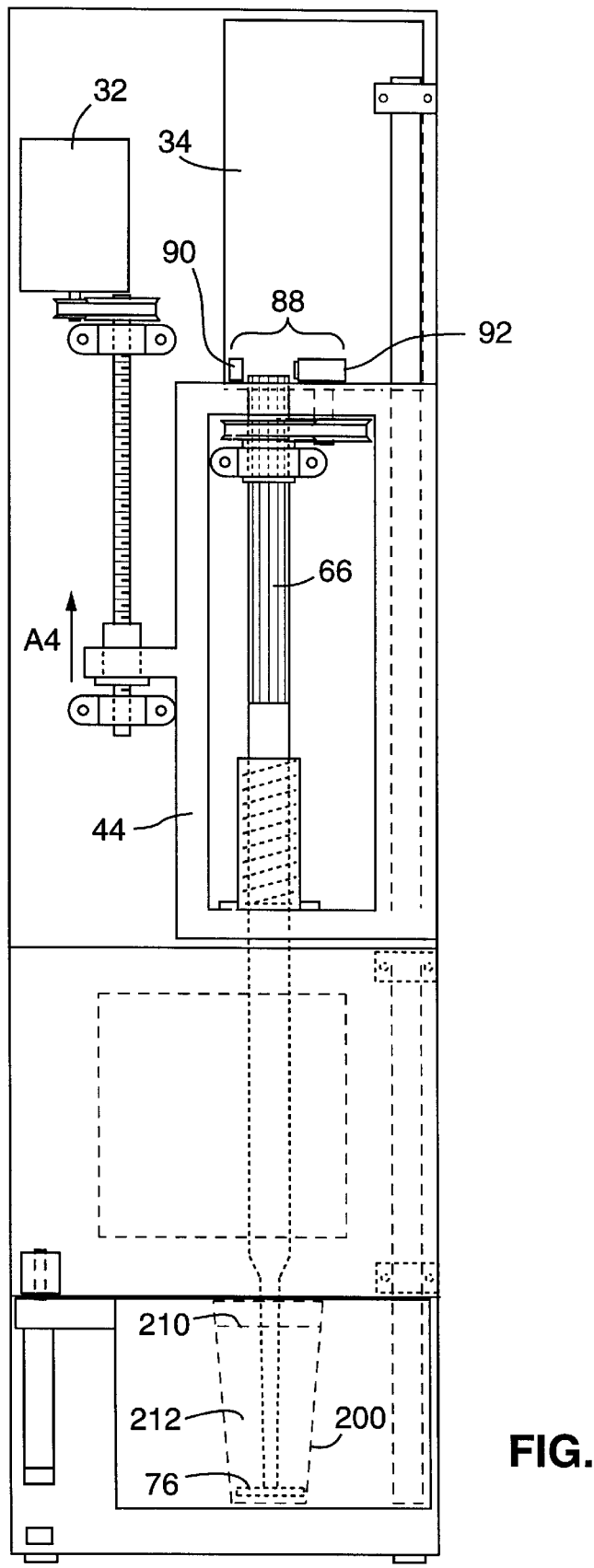
FIG. 6B is a front elevation view of the frozen drink machine of FIG. 2 showing the carriage and the blade at the ends of their respective downward travels.

Referring to FIGS. 6A and 6B, an optical detector 88 is mounted to the top of carriage 44. Optical detector includes a light source 90 and a receiver 92 which detects light emitted by light source 90. Optical detector 88 is positioned to detect whether the upper end of splined shaft 66 is extending above the carriage 44. When the upper end of the shaft 66 extends above the carriage 44, receiver 92 is prevented from receiving light emitted by light source 90. When the carriage 44 is lowered and the upper end of the splined shaft 66 can be detected by the optical detector 88, it indicates that the blade 76 has not yet reached the bottom of the serving cup 200 which contains the milkshake ingredients.

Optical detector 88 is electronically coupled to microprocessor 35 (FIG. 4A). When the blade 76 reaches the bottom of the serving cup 200 during use of the milkshake machine, this information is received by the microprocessor 35 and used to control the milkshake making operation as will be discussed below.

Figure 7:
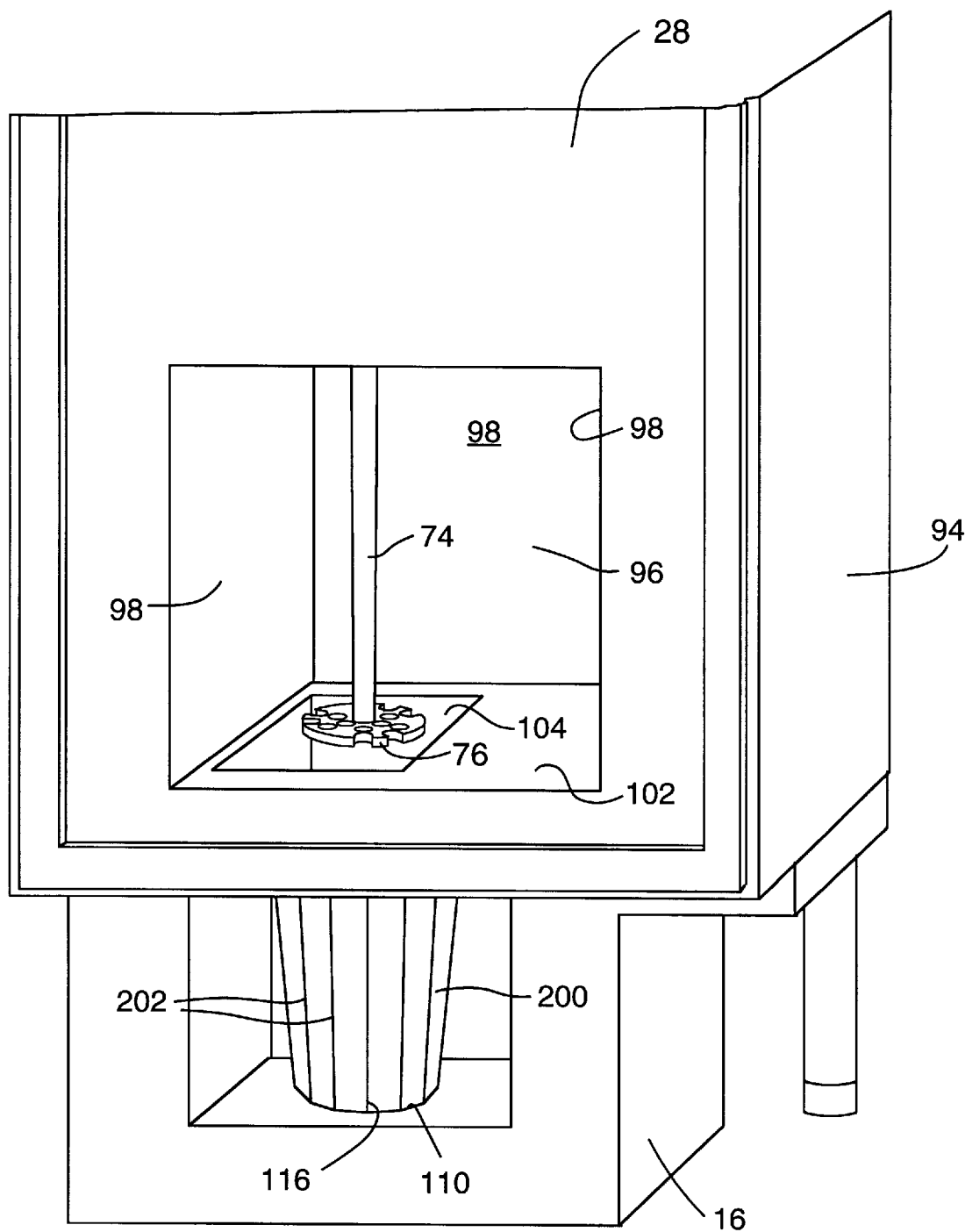
FIG. 7 is a perspective view of the cup housing according to the present invention.

Referring to FIGS. 3, 4A and 7, support frame 28 has a lower portion 94 positioned above the cup housing 16. Lower portion 94 includes a cooled recessed section 96 which, when the blending assembly housing 14 is pivoted to the closed condition shown in FIG. 3, faces the portion of the refrigerated compartment 18 which lies below shelf 20.

Because the refrigerated compartment 18 is cooled by its internal refrigeration unit, and because the recessed section 96 is exposed to the refrigerated compartment 18, the recessed section 96 is likewise cooled to a temperature of approximately 40° F. or below.

Recessed section 96 is bounded by three side walls 98, a top wall 100 (FIG. 4A), and a bottom wall 102. Openings 104a, 104b shown in FIG. 3, are formed in top and bottom walls 102. These openings permit the blade 76 to extend into the recessed section 96 and to pass from the recessed section into the cup 200.

A solenoid latch 103 having a plunger 105 (FIGS. 8A and 8B) is attached to lower portion 94 of housing 14. The solenoid latch 103 works in a conventional manner. Plunger 105 is spring biased in the elevated condition shown in FIG. 9. When solenoid latch 103 is energized, plunger 105 slides vertically downward to the latched position shown in FIGS. 8A and 8b.

Figure 8A:
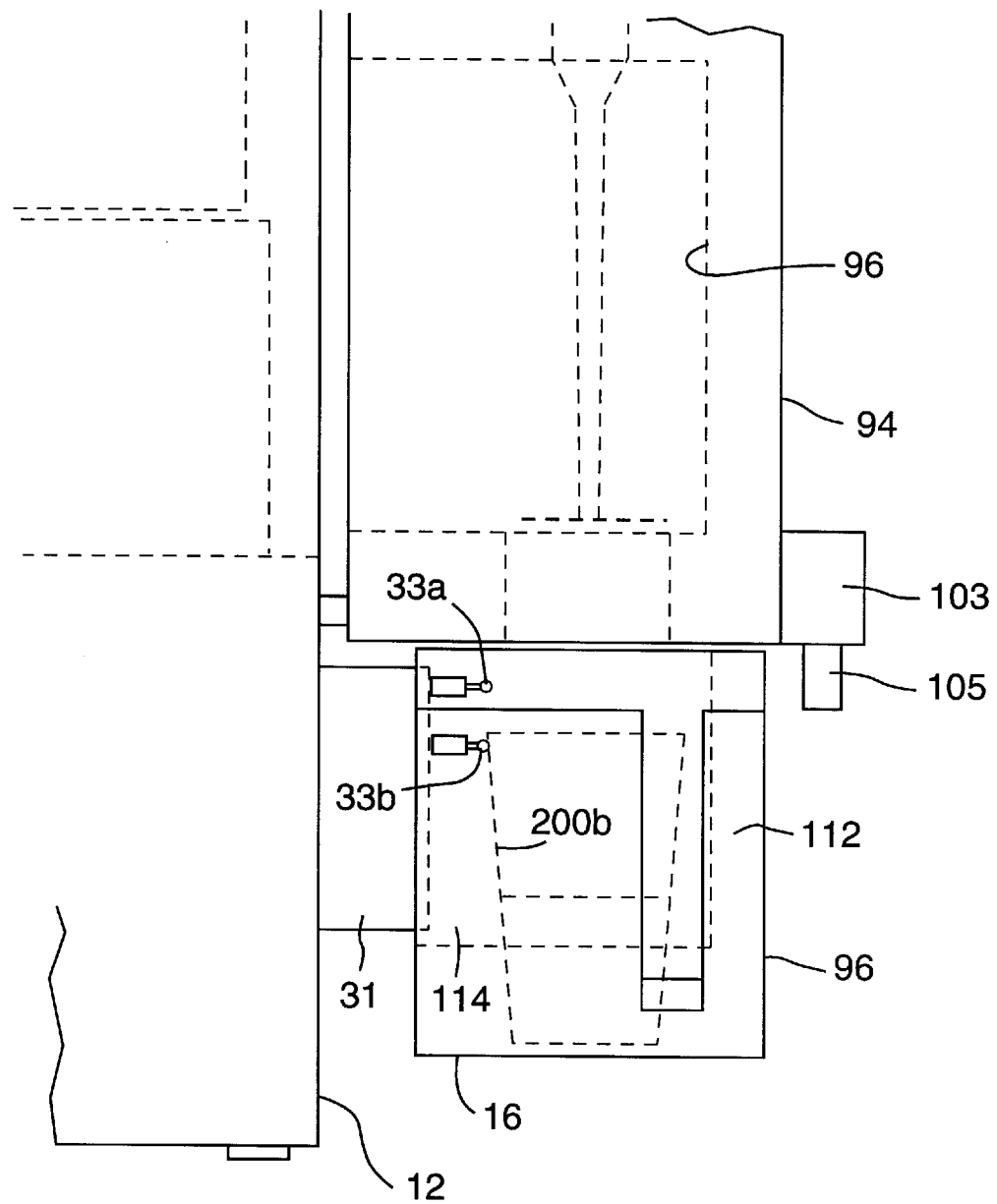
FIGS. 8A and 8B are side views of the cup housing of the frozen drink machine of FIG. 1, showing small and large cups, respectively, positioned in the cup housing.
Figure 9:
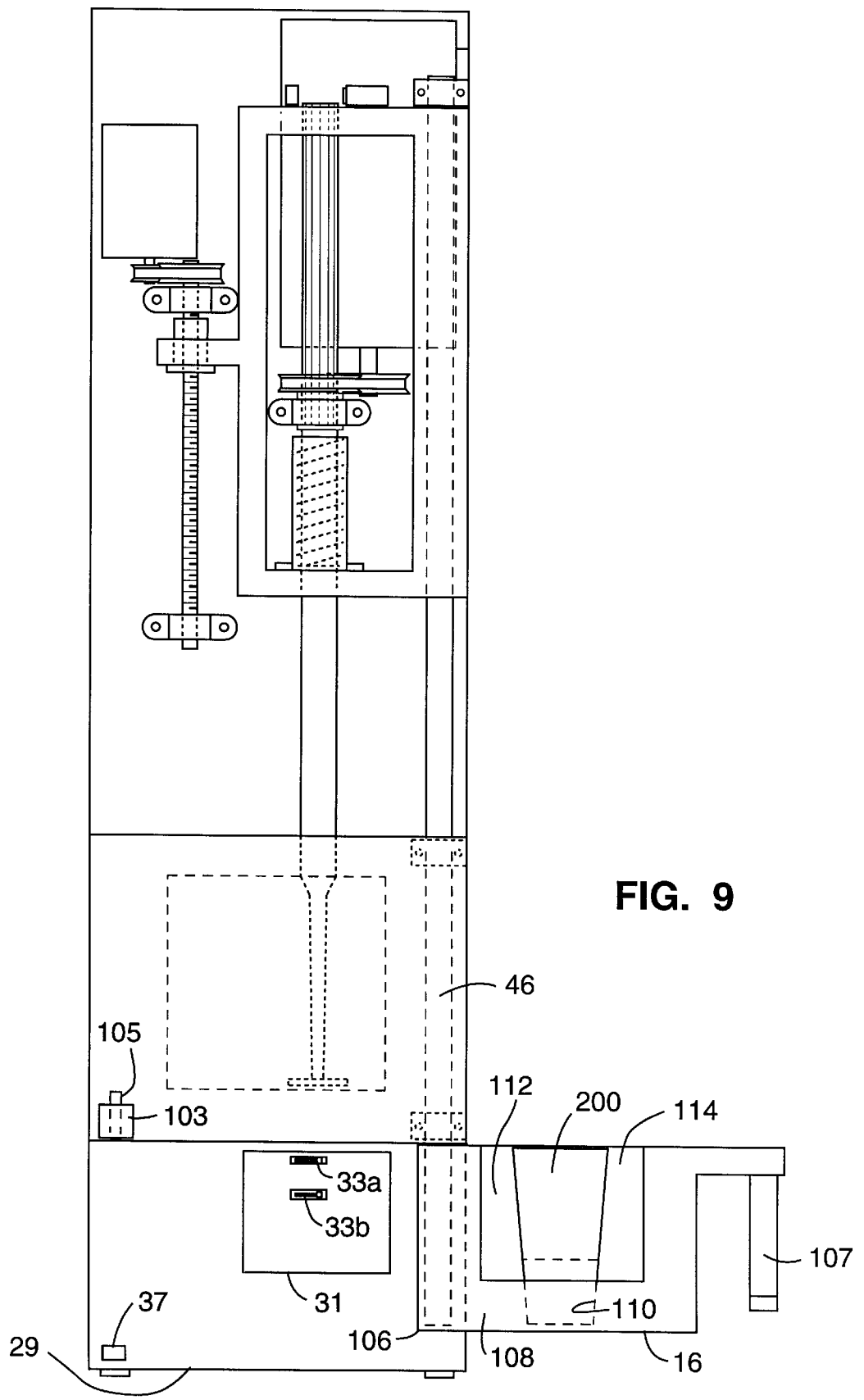
FIG. 9 is a front elevation view, similar to the view of FIG. 2, in which the cup support assembly is pivoted into the opened condition.

Referring to FIG. 9, cup housing 16 includes a side section 106 which is hinged to the rod 46. Cup housing is pivotable about the rod 46 between the closed position shown in FIG. 2 and the open position shown in FIG. 9. A handle 107 is provided to permit the cup housing to be easily pivoted between the closed and open positions. When the solenoid plunger 105 is in the latched position shown in FIG. 8A, it prevents the cup housing from being moved to the open position.

Referring to FIG. 9, cup housing 16 includes a tray 108 which is provided with a cut-out 110 for receiving a serving cup 200. The portion 114 of the cup housing 16 above the tray is open.

Figure 8B:
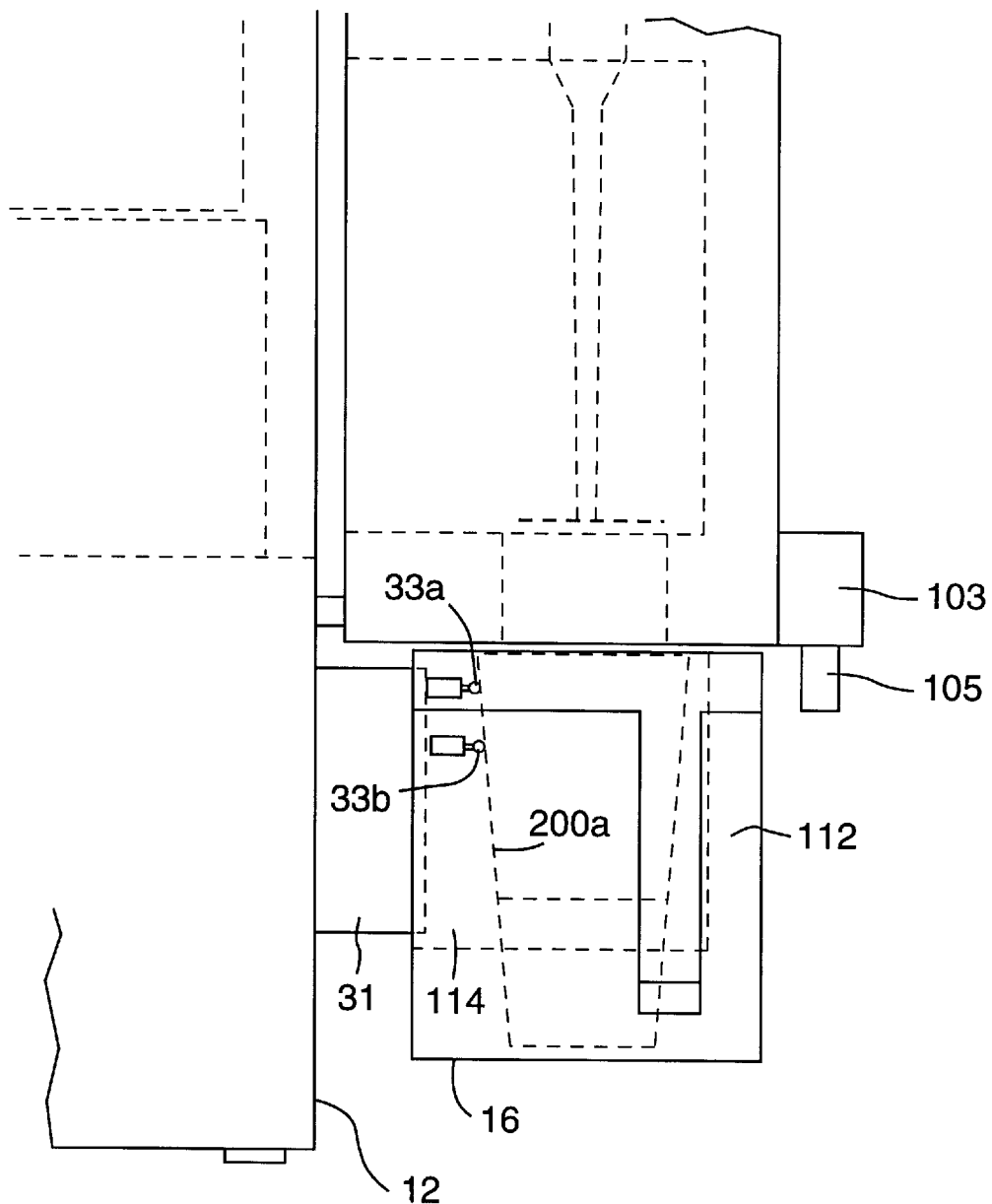

Cup housing 16 further includes an outer wall 112 which, when the cup housing is in the closed position, causes the cup 200 to be enclosed between the outer wall 112 and base portion 29 of refrigerator housing 12. Moreover, and as best shown in FIGS. 8A and 8B, when the cup housing 16 is in the closed condition, the block 31 which is attached to refrigerator housing 12 extends into the open portion 114 of the cup housing 16. The wall 112 and the block 31 are important because they prevent access to the cup during the processing cycle, when it would be very dangerous to disturb the cup due to the sharp blade spinning at high RPM inside the cup.

Referring again to FIGS. 8A and 8B, when a cup is positioned in the cup housing and the cup housing placed in the closed condition, the cup depresses at least one of the limit switches 33a, 33b. A short cup 200b, shown in FIG. 8A, will depress only lower limit switch 33b, whereas a tall cup 200a, shown in FIG. 8B will depress both lower and upper limit switches 33a, 33b. The switches 33a, 33b provide a means by which the presence of a cup in the cup housing may be detected. As will be described in detail below, when at least one of the switches 33a, 33b is closed, the microprocessor activates solenoid latch 103, causing the cup housing 16 to be locked in the closed condition and generates starting signals which cause the frozen drink making cycle to begin.

The limit switches 33a, 33b also deliver information to the microprocessor 35 (FIG. 4A) concerning the size of the cup which is positioned in the cup housing. As detailed below, this will ensure that the appropriate quantity of milk is delivered into the cup for the size milkshake which is to be made. Also, because the surface 206 (FIG. 1) of the frozen block 204 is lower in a smaller cup than in a relatively larger cup, the microprocessor can ensure that the blade 76 is lowered to the proper height before it is caused to begin spinning.

Referring to the perspective view of FIG. 7, cut-out 110 includes ridges 116 around its perimeter. These ridges are designed to engage with like ridges 202 on the outside surface of the serving cup 200. This prevents cup 200 from rotating within the cut-out 110 as the rotating blade advances through the frozen substance.

Blade

FIGS. 10A and 10B are top and side views, respectively, of blade 76. Blade 76 is preferably a 2.5 inch diameter stainless steel blade having a circular shape and a thickness of approximately 0.080 inches. Three-eighth inch diameter holes 118a, 118b and 118c are spaced 120° apart rotationally and at specific radiuses from the center of the blade such that as the blade makes one complete rotation, the entire surface area of the frozen substance will have been passed over by three holes. Holes 118a are centered 0.041 inches from the blade's center, and holes 118b and 118c are spaced 0.062 inches and 0.083 inches from the blade's center respectively. Depressed regions 120, best shown in the cross section view of FIG. 10C, are formed immediately adjacent to each of the holes, located on their trailing edge as the blade rotates. These regions are depressed by 0.080 inches. The holes and the depressed regions are arranged such that as the blade 76 is rotated and advanced into the frozen substance in the cup 200 (FIG. 1), the holes 118a–c and depressed regions 120 grate through the frozen substance much like the grating action of a cheese grater. It should be appreciated that the blade of FIG. 10A is configured such that clockwise rotation of this blade produces the desired grating effect. This arrangement also provides for easy manufacture in a stamping operation, and maintains the mechanical strength of the blade so that its outside edges are not deflected upward by the force of the frozen substance being bored through. Other arrangements with differing size or shaped holes will also work well.

Three waves are formed in the blade. As shown in FIGS. 10A and 10C, each of the waves 122 includes a center crease 124 which is elevated above the plane of the blade and side creases 126 which lie in the plane of the blade. The creases 124 and 126 are approximately ½ inches in length and extend radially from the perimeter of the blade. A distance along the perimeter of the blade of approximately ½ inch separates each pair of side creases 126. During high speed rotation of the blade, the waves 122 increase the whipping effect of the blade by causing an alternately high and low pressure zone at the blade's edge, creating turbulent eddies which cause a whipping effect.

Three pairs of cutouts 128 are formed along the perimeter of the blade 76, spaced 120° from each other. Each pair includes a first cutout which has a depressed trailing edge 130 and a second cutout which has an elevated trailing edge 132. During a milkshake making operation, the trailing edge 130 is depressed to act as a grating surface to bore through the frozen substance at the outermost radius of the blade. The trailing edge 132 is elevated to act as a inverted ramped surface to force milkshake downward in the cup and thereby minimize the amount of milkshake that is driven up the interior walls of the cup by centrifugal force. Moreover, by directing milkshake ingredients above the blade, which are carried to the outer edge of the blade by centrifugal force, to then be forced downward and under the blade as the rotating blade moves upward, the elevated trailing edge 132 helps prevent the blade from carrying ingredients up and out of the cup as the blade is lifted from the cup.

Operation

Operation of the frozen drink machine according to the present invention will next be described.

First, cup housing 16 is pivoted to the opened condition shown in FIG. 9 and a cup 200 containing the frozen substance 204 is positioned in the cut-out 110. Cup housing 16 is then pivoted to the closed position shown in FIG. 2.

Next, carriage motor 32 is activated. Activation of carriage motor 32 causes rotation of carriage motor shaft 36 and pulley 38, and through belt 39 further causes rotation of pulley 61 which is attached to the vertical screw drive shaft 58, causing it to rotate. Counterclockwise rotation of screw drive shaft 58, when viewed from the top, causes carriage 44 to advance vertically downward as indicated by arrow A3 in FIG. 2. Carriage 44 has spindle shaft 66 mounted to it such that when carriage 44 advances vertically downward, spindle shaft 66 advances downward as well, with one exception which will be explained shortly. As blade 76, attached to the bottom of spindle shaft 66, approaches the surface 206 of the frozen substance 204, blade motor 34 is activated causing rotation of pulley 42, and through belt 43, rotation of pulley 71 which is attached to spindle shaft 66, causing it and blade 76 to spin. Downward travel of carriage 44 continues and blade 76 makes contact with the surface 206 of the frozen substance and begins boring down through it.

At the time boring begins, the milk pump is activated and begins pumping milk into the cup through tube 24 for mixing and whipping with the small frozen particulate being created by the boring action of the blade. Approximately six ounces of milk is pumped into the cup over a period of approximately three to five seconds, depending on the desired consistency of the finished milkshake.

The downward travel of the carriage 44 is generally driven at a rate faster than the blade 76 can bore through the frozen substance in the cup. This disparity in downward travel rates causes the downward travel of the spindle shaft 66, to which the blade 76 is attached, to be slower than the downward travel of carriage 44. This forces the spindle shaft 66 to move upward within its mountings on the carriage 44 and for spring 80 to be compressed as shown in FIG. 6A. The carriage 44 is driven to its lowest most point of travel, as shown in FIG. 6B, and then the carriage motor 32 is deactivated.

The blade 76 continues to grate and blend the frozen substance 204 within the cup 200 as it moves downward in the cup, driven by the gradual relaxation of the compressed spring 80 (FIGS. 5B and 6A) acting on spindle shaft 70. When the optical detector 88 senses that the spindle shaft has progressed all the way to the bottom of the cup as shown in FIG. 6B, the boring stage of the process is complete.

The reason for this spring release arrangement is to allow for a high rate of travel speed of the carriage 44 from its uppermost position at the beginning of the cycle to the bottom of its travel. This is advantageous because it allows the blade 76 to bore as quickly as the frozen substance will allow. Softer frozen substances can be bored through more quickly. Without this spring release arrangement, time would be wasted as the carriage 44 would have to be driven downward as slowly as the hardest frozen substance could be bored through in order to be sure the blade motor 34 is not stalled out by an excessive torque requirement to continue the blade's rotation. An additional advantage is that the exact rotational speed for the carriage motor 32, driving the downward travel of the carriage during boring, becomes less critical. This simplifies the controls required for this motor.

Given these two advantages of the spring release it can be appreciated that the same advantages could be accomplished through a variety of other means, including placing the spring mechanism on the screw drive shaft or its mountings rather than on the spindle shaft, or placing a slip clutch in the connection of the carriage motor to the screw drive shaft which would slip as the spindle and carriage's downward travel was caused to slow down by the resistance of the boring blade against the frozen substance.

With the boring stage complete, as signaled by the optical detector 88 when the blade 76 reaches the bottom of the cup, the carriage motor 32 is caused to reverse polarity and is activated to begin to move the carriage, and with it, the spindle drive shaft and blade, upward as indicated by arrow A4 in FIG. 6B. At this point in the process the rotating blade 76 acts as a mixing and whipping agitator, with the important feature of being formed such that its slim cross-sectional profile does not cause excessive rotation of the entire contents of the cup. The carriage motor 32 raises the carriage, and with it, the rotating blade up through the milkshake, completing the mixing and whipping of the frozen particulate and milk into a milkshake as it travels vertically through it.

Some formulations of milkshake benefit from a second vertical pass of the mixing/whipping blade through the milkshake, in which case the mixing blade's vertical travel is stopped one inch below the surface 210 of the milkshake 212 (labelled in FIG. 6B), and the polarity of the carriage motor 32 is again reversed and the blade 76 is moved back down to the bottom of the cup. Upon reaching the bottom, the polarity of the carriage motor 32 is again reversed and the blade is moved back upward in the cup 200 to a point one inch below the surface 210 of the milkshake 212.

With the mixing and whipping process complete, and the blade reaching the point one inch below the surface 210 (FIG. 6B) of the milkshake 212, the blade motor 34 is deactivated and a braking force applied to the blade motor to slow its rotational speed. This slowing of the blade's rotational speed prevents splattering of milkshake out of the cup as the blade breaks through the surface 210 of the milkshake 212. With the rotation slowed, the carriage moves up to a point where the blade is approximately one half inch above the surface 210 of the milkshake 212, but still below the top lip of the cup, and stops momentarily. With the carriage stopped momentarily, the blade motor is reactivated momentarily, causing the blade to spin and fling any remaining milkshake material off the blade and back into the cup below its upper lip. After a momentary spinning of approximately one half second, the blade motor 34 is deactivated, and the carriage motor 32 reactivated to bring the carriage and blade upward to its original position above the cup. At this point the process is complete and the cup can be removed for serving by opening cup housing 16 and removing cup 200 from the recess 110.

As shown in FIG. 2, when the carriage 44 and blade 76 are in their original positions, the blade 76 and the narrow portion 75 of shaft 70 are disposed within recessed section 96 of the housing 14. As described above, this section of the housing is cooled by the refrigerated compartment 18 and is thereby maintained at bacteriologically safe temperatures. Accordingly, blade 76 and shaft section 74 need not be washed between milkshake making operations, even if the milkshake making operations are separated by several minutes or hours. The cooled compartment minimizes the risk that residual milk left on these components will sour and/or promote bacteria formation.

Microprocessor Control

Figure 11:
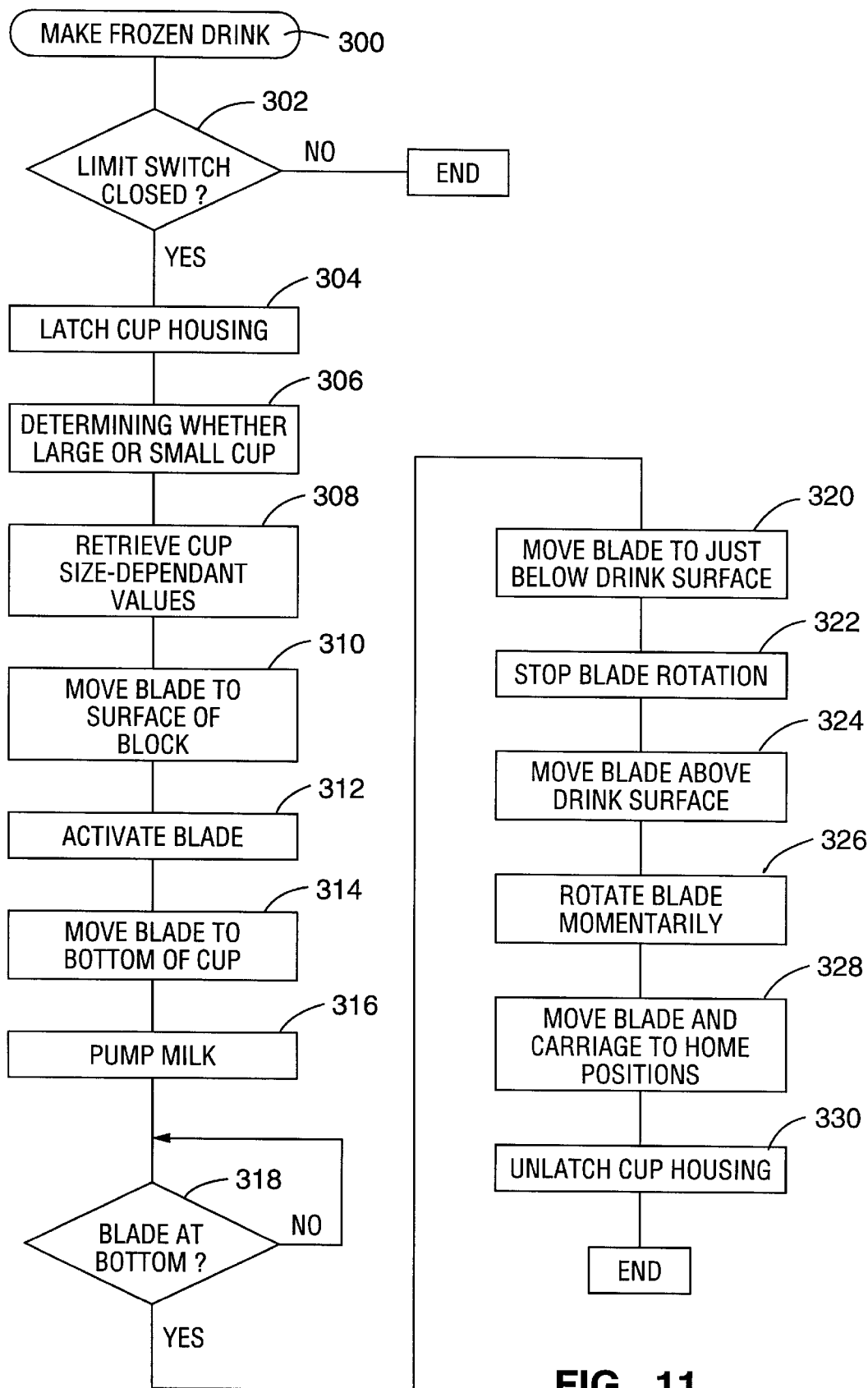
FIG. 11 is a simplified flow diagram showing the functions of the microprocessor of the present invention.

The functions of the microprocessor 35 in controlling the frozen drink making operation will next be discussed with reference to FIG. 11. A frozen drink making operation is commenced at step 300 when a user presses the start button 37 (FIG. 2). Next, the microprocessor 35 detects whether at least one of the limit switches 33a, 33b (FIGS. 8A and 8B) is closed, which indicates the presence of a cup 200 in the cup housing 16. If a limit switch is closed, the microprocessor 35 causes activation of the solenoid latch 103, step 304, such that plunger 105 moves to the latched condition shown in FIG. 8A to latch the cup housing 16. If a limit switch is not closed, the microprocessor terminates the milkshake making procedure or it may alternatively continue monitoring the limit switches for a predetermined period of time.

Next, at step 306 the microprocessor 35 determines whether a tall cup 200a (FIG. 8B) or a short cup 200b (FIG. 8A) is positioned in the cup housing 16 by determining whether only one limit switch 33b is closed, indicating a small cup, or whether both limit switches 33a, 33b are closed, indicating a large cup.

At step 308, the microprocessor retrieves certain cup size-dependent values from look up tables stored in its memory. For example, because a larger quantity of milk is needed for a large milkshake than for a small milkshake, one of the stored values is the length of time for which the peristaltic pump 26 will be made to pump milk into the cup 200. The other stored values include (1) those indicating the distance to be travelled, or the amount of time for travel, by the carriage 44 to position the blade 76 at the surface 206 of the frozen block 204, which will be higher for a large cup than it will for a small cup; (2) those indicating the distance to be travelled (or the amount of time for travel) by the carriage from the surface 206 of the frozen block 204 to the bottom of the cup; (3) those indicating the distance to be travelled (or the amount of time for travel) by the carriage to lift the blade from the milkshake to a height just below the upper surface 210 (FIG. 6B) of the milkshake 212; and (4) those indicating the distance to be travelled (or the amount of time for travel) by the carriage to lift the blade from the milkshake to a height just above the upper surface 210 of the milkshake 212.

Figure 4B:
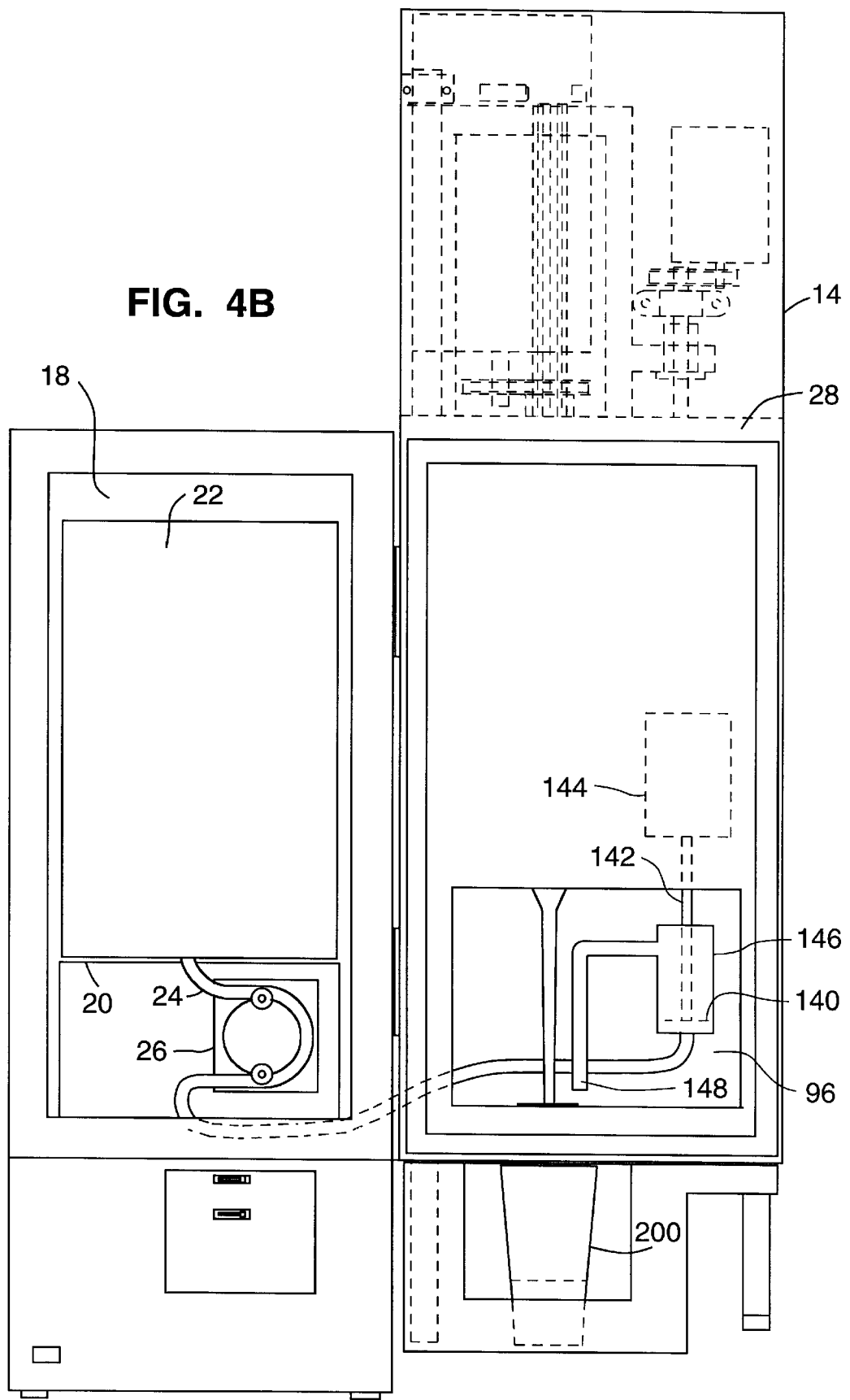
FIG. 4B is a front elevation view, similar to the view of FIG. 4A, of a second embodiment of the frozen drink machine, in which an assembly for pre-whipping milk before it is added to the frozen substance is included.

During steps 310 through 316, the stored values retrieved at step 308 are used to generate control signals which control the carriage motor 32, blade motor 34, and peristaltic pump 26. Specifically, the microprocessor at step 310 instructs the carriage motor 32 to advance the carriage by the appropriate number of steps to position the blade 76 just above the surface 206 of the frozen block. At step 312 the microprocessor further directs the carriage motor 32 to advance the carriage 44 by the appropriate number of steps which will cause the blade 76 to move to the bottom of the cup (step 314). At step 316, the microprocessor delivers control signals to cause the peristaltic pump 26 to pump milk into the cup through opening 37 for the amount of time which will deliver the proper quantity of milk into the cup. It should be appreciated that if the embodiment of FIG. 4B is used, the microprocessor would also initiation rotation of whipping motor 140 at this step in the process and whipped milk would be delivered into the cup through outlet 148.

At step 318, the microprocessor looks to the optical sensor 88 and awaits a signal from the optical sensor indicating that the blade 76 has reached the bottom of the cup (FIG. 6B). When the blade 76 has reached the bottom of the cup, the microprocessor instructs (steps 320) the carriage motor 32 to move the carriage 44 vertically upward by an amount which will position the blade 76 approximately one inch below the milkshake surface 210.

Next, the microprocessor directs the blade motor 34 (step 322) to deactivate and thereby slows the rotation of the blade 76. As described above, this prevents splattering of milkshake out of the cup as the blade breaks through the surface 210 of the milkshake 212.

Next, at step 324, the carriage motor 32 is caused to advance the carriage 44 such that the blade 76 is approximately one half inch above the surface 210 of the milkshake 212, but still below the top lip of the cup 200. With the carriage stopped momentarily, the microprocessor reactivates the blade motor 34 for approximately 0.5 seconds (step 326), causing the blade to spin and fling any remaining milkshake ingredients off the blade and back into the cup below its upper lip. At step 328, which occurs after the reactivation of the blade motor 34, the carriage motor 32 is instructed to move the carriage 44 and blade 76 into their original positions above the cup 200. Finally, at step 330, the microprocessor 35 causes deactivation of the solenoid latch 103, causing plunger 105 to move to the unlatched position shown in FIG. 9, allowing the cup housing 16 to be opened by a user.

Alternative Embodiment

As described above, it is important to the milkshake consistency to have air whipped into the milk or milkshake before the milkshake is served. This may be accomplished in the manner described with respect to the first embodiment, in which aeration of the milk and/or milkshake occurs due to the action of the blade 76 within the cup.

Alternatively, the milk may be whipped by a separate whipping blade which acts on the milk before the milk is introduced into the cup 200. Referring to FIG. 4B, a whipping blade 140 may be provided for this purpose. Whipping blade 140 is mounted to the end of a shaft 142 which is rotatably coupled to a whipping motor 144. Motor 144 is mounted to the support frame 28.

The whipping blade 140, shaft 142 and motor 144 may be of the type commonly found on traditional milkshake blenders, such as the Model 936 made by Hamilton Beach. Whipping blade, shaft, and whipping motor are mounted within the blending assembly housing 14 such that the whipping blade 140 and the shaft 142 extend into the refrigerated section 96 and such that whipping blade 140 extends into a vessel 146.

The tubing 24 which extends from the box 22 of milk is connected to the vessel 146 such that milk is pumped by the peristaltic pump 26 into the bottom of vessel 146. Air is introduced into the milk by the whipping action of the whipping blade 140. Further pumping of the peristaltic pump 26 causes the milk to exit the vessel 146 via an outlet 148 directed into the cup 200. These components are preferably disposed within the refrigerated section 96 in order to prevent possible souring of the milk and bacterial formation.

The remaining features of the embodiment of FIG. 4B are identical to those of the embodiment of FIG. 2 and will not be described in detail.

The present invention has been described with respect to first and second embodiments, however, it should be appreciated that the invention described herein should be limited only in terms of the appended claims and not be restricted by any of the described embodiments.

I claim:

1. An apparatus for making frozen drinks from a frozen substance frozen into a cup, comprising:

a housing;

a cup support mounted to the housing;

a liquid dispenser having an outlet positioned to direct liquid into a cup positioned in the cup support;

grinding means for, when a cup containing a frozen substance is positioned in the cup support, grinding the frozen substance to form a ground substance; and aeration means for, when a cup containing a frozen substance is positioned in the cup support, causing air to be incorporated into a mixture of the ground substance formed by the grinding means and the liquid dispensed by the liquid dispenser.

2. The apparatus of claim 1 wherein the grinding and aeration means comprise a rotatable blade assembly mounted within the housing for extension into a cup positioned in the cup support.

3. The apparatus of claim 2 wherein the blade assembly includes a blade member mounted on a shaft, the blade member including first regions lying within a plane and spaced apart regions at least partially outside the plane such that during rotation of the blade member in a fluid, the aeration elements cause alternately high and low pressure zones in the fluid and thus create turbulent eddies which cause a whipping effect.

4. The apparatus of claim 2 wherein the blade assembly is moveable between upper and lower blade positions, the lower blade position being at a height such that when a cup is positioned in the cup support, the blade assembly is positioned within the cup and adjacent to the cup bottom, and wherein the apparatus further includes control means for causing the blade assembly to move between the upper and lower blade positions at least twice.

5. The apparatus of claim 2 further comprising:

a cup sensor for detecting the size of a cup in the cup support and for producing an output corresponding to the size of the cup; and control means responsive to the output of the cup sensor for generating blade rotation speed and vertical blade positioning control signals which correspond to the size of the cup detected by the cup sensor, the blade assembly being responsive to the blade rotation speed and vertical blade positioning control signals.

6. The apparatus of claim 2 further comprising:

an initiation switch;

a cup sensor for detecting the presence of a cup in the cup support and for producing an output;

control means for generating up and down blade movement control signals and blade rotation control signals;

a slidable and rotatable shaft attached to the blade assembly and moveable between upper and lower positions corresponding to upper and lower blade positions;

first and second motors coupled to the shaft, the first motor responsive to the blade movement control signals to move the shaft between the upper and lower positions, the second motor responsive to the blade rotation control signals to rotate the blade assembly, the control means responsive to activation of the initiation switch and to output of the cup sensor to allow the blade assembly to rotate and to be lowered into a cup when a cup is detected in the cup support and when a user activates the initiation switch.

7. The apparatus of claim 2 wherein the apparatus is for making a frozen drink having a top surface and wherein:

the blade assembly is moveable between upper and lower blade positions; and the control means is further for generating blade speed control signals to reduce the rotational speed of the blade assembly when the blade assembly is moved to a first level and to increase the rotational speed of the blade assembly when the blade assembly is moved to a second level, the first level corresponding to a level beneath the top surface of a frozen drink in a cup positioned in the cup support, and the second level corresponding to a level above said top surface.

8. The apparatus of claim 1 wherein:

the grinding means includes a first blade mounted within the housing for extension into a cup positioned in the cup support;

the liquid dispenser includes a vessel and the outlet is positioned to direct liquid from the vessel into a cup positioned in the cup support; and the aeration means includes a second rotatable blade extending into the vessel.

9. The apparatus of claim 1 further comprising:

a cup sensor for detecting a characteristic of a cup in the cup support and for producing an output corresponding to the characteristic of the cup; and control means for generating liquid dispensing control signals which correspond to the characteristic of the cup detected by the cup sensor, the liquid dispenser being responsive to the liquid dispensing control signals to dispense liquid into the cup.

10. The apparatus of claim 9 wherein the characteristic is the size of the cup and wherein the liquid dispenser is responsive to the liquid dispensing control signals to dispense a volume of liquid which corresponds to size of the cup.

11. An apparatus for making frozen drinks from a frozen substance frozen into a cup, comprising:

a housing;

a cup support mounted to the housing;

a rotatable blade assembly mounted within the housing, the blade assembly including shaving elements and aeration elements, the blade assembly moveable between upper and lower blade positions, the lower blade position being at a height such that when a cup is positioned in the cup support, the blade assembly is positioned within the cup and adjacent to the cup bottom.

12. The apparatus of claim 11 characterized further in that the blade assembly includes at least one surface area shaped to pump fluid toward the bottom of the cup in response to rotation of the blade assembly.

13. The apparatus of claim 11 wherein the blade assembly shaving elements and aeration elements are in close vertical proximity to one another.

14. The apparatus of claim 11 wherein the aeration elements include first regions lying within a plane and spaced apart regions at least partially outside the plane such that during rotation of the blade assembly in a fluid the aeration elements cause alternately high and low pressure zones in the fluid, and thus create turbulent eddies which cause a whipping effect.

15. The apparatus of claim 11 further comprising:

a rod mounted with the housing;

a carriage slidable on the rod between upper and lower carriage positions corresponding to the upper and lower blade positions, the rotatable blade assembly being carried by the carriage;

a first motor coupled to the carriage for movement of the carriage between upper and lower positions corresponding to the upper and lower blade positions.

16. The apparatus of claim 11 wherein the grating elements include depressed edges formed adjacent openings in the blade assembly.

17. The apparatus of claim 11 wherein the blade assembly includes an upper surface and wherein the apparatus further comprises means for, when the blade assembly is immersed and rotated in a cup containing liquid, directing liquid from above the upper surface of the blade assembly to below the blade assembly.

18. The apparatus of claim 11 wherein the apparatus further includes control means for causing the blade assembly to move between the upper and lower blade positions at least twice.

19. The apparatus of claim 11 further including:

an initiation switch configured to produce an output when activated by a user;

a cup sensor for detecting the presence of a cup in the cup support and for producing an output;

control means responsive to activation of the initiation switch and to the output of the cup sensor to cause the blade assembly to rotate and to be lowered into a cup when a cup is positioned into the cup support when a cup is detected in the cup support and when a user activates the initiation switch.

20. The apparatus of claim 11 further comprising:

a threaded guide rod mounted within the housing;

a slidable and rotatable blade shaft having the blade assembly attached thereto, the blade shaft drivable between upper and lower positions by rotation of the threaded guide rod; and a first motor coupled to the threaded rod for driving the slidable and rotatable blade shaft between upper and lower positions corresponding to the upper and lower blade positions.

21. The apparatus of claim 20 wherein:

the apparatus further includes control means for generating slidable blade shaft movement control signals and blade rotation control signals, the first motor responsive to the slidable blade shaft movement control signals to move the slidable blade shaft between the upper and lower positions; and a second motor responsive to the blade rotation control signals to rotate the blade assembly.

22. The apparatus of claim 21 wherein:

the apparatus further comprises an initiation switch and a cup sensor for detecting the presence of a cup in the cup support and for producing an output; and the control means is further for generating the blade movement control signals and the blade rotation control signals in response to activation of the initiation switch and the output of the cup sensor to allow the blade assembly to rotate and to be lowered into a cup when a cup is detected in the cup support and when a user activates the initiation switch.

23. The apparatus of claim 11 wherein the apparatus is for making a frozen drink having a top surface and wherein the apparatus includes:

a cup sensor for detecting the presence of a cup in the cup support and for producing an output; and control means for generating blade speed control signals to reduce the rotational speed of the blade assembly when the blade assembly is moved to a first level and to increase the rotational speed of the blade assembly when the blade assembly is moved to a second level, the first level corresponding to a level beneath the top surface of a frozen drink in a cup positioned in the cup support, and the second level corresponding to a level above said top surface.

24. The apparatus of claim 11 further comprising:

a cup sensor for detecting the size of a cup in the cup support and for producing an output corresponding to the size of the cup; and control means responsive to the output of the cup sensor for generating blade rotation speed and vertical blade positioning control signals which correspond to the size of the cup detected by the cup sensor, the blade assembly being responsive to the blade rotation speed and vertical blade positioning control signals.

25. The apparatus of claim 11, further comprising a cup sensor for detecting a characteritic of a cup in the cup support and for producing an output corresponding to the characteristic of the cup; and control means for generating liquid dispensing control signals which correspond to the characteristic of the cup detected by the cup sensor, the liquid dispensing being responsive to the liquid dispensing control signals.

26. The apparatus of claim 25 wherein the charateristic is the size of the cup and wherein the liquid dispenser is responsive to the liquid despensing control signals to dispense a predeterminded volume of liquid corresponding to the size of the cup.

27. An apparatus for making frozen drinks from a frozen substance frozen into a cup, comprising:

a housing;

a cup support mounted to the housing;

a liquid dispenser having an outlet positioned to direct a predetermined volume of liquid into a cup position in the cup support;

a shaft mounted to the housing the shaft carrying a rotatable blade having shaving elements and aeration elements formed thereon, the shaft moveable relative to the housing to carry the blade between an upper blade position remote from the cup support and a lower blade position adjacent to the cup support, the blade configured to, when it is lowered into a cup containing frozen substance, shave the frozen substance, mix the frozen substance with liquid dispensed by the liquid dispenser, and incorporate air into the formed mixture of frozen substance and liquid.

* * * * *